United States Patent [19]

Kawata

[11] Patent Number: 5,243,441
[45] Date of Patent: Sep. 7, 1993

[54] HALF TONE IMAGE PROCESSING CIRCUIT WITH IMPROVED SCALE REDUCTION IMAGES AND METHOD FOR REDUCING HALF TONE IMAGES

[75] Inventor: Toshiyuki Kawata, Hyogo, Japan

[73] Assignee: Mitsubishi Denki Kabushiki Kaisha, Tokyo, Japan

[21] Appl. No.: 686,526

[22] Filed: Apr. 17, 1991

[30] Foreign Application Priority Data

Jul. 9, 1990 [JP] Japan .................................. 2-181236

[51] Int. Cl.⁵ .............................................. H04N 1/40
[52] U.S. Cl. ..................................... 358/451; 358/457
[58] Field of Search ............... 358/451, 452, 454, 457, 358/458

[56] References Cited

U.S. PATENT DOCUMENTS 4,739,415  4/1988  Toyono et al. ...................... 358/451
4,812,915  3/1989  Tada .................................... 358/451
4,930,022  5/1990  Kubota ................................ 358/451
5,001,575  3/1991  Nakahara ............................ 358/451

Primary Examiner—Stephen Brinich
Attorney, Agent, or Firm—Rothwell, Figg, Ernst & Kurz

[57] ABSTRACT

A half tone image processing circuit in which samples of an image signal are compared with elements of a dither matrix to generate a binary image signal, and including a scale reduction circuit for canceling predetermined bits from the binary image signal to effect a reduction in size of an image produced in accordance with the binary image signal. A dither generation circuit sequentially outputs the dither elements in response to a clock signal. During scale reduction, the incrementing of the dither generation circuit is halted when samples are received that correspond to the bits to be canceled, so as to avoid picture quality degradation by maintaining continuity of the dither generation pattern.

8 Claims, 14 Drawing Sheets

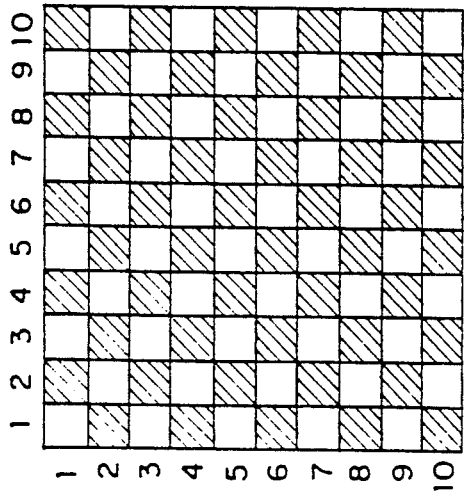
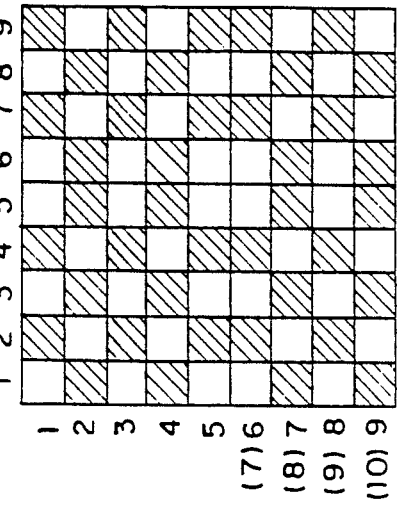
FIG. 3(a) (PRIOR ART)
FIG. 3(b) (PRIOR ART)
FIG. 3(c) (PRIOR ART)
FIG. 3(d) (PRIOR ART)

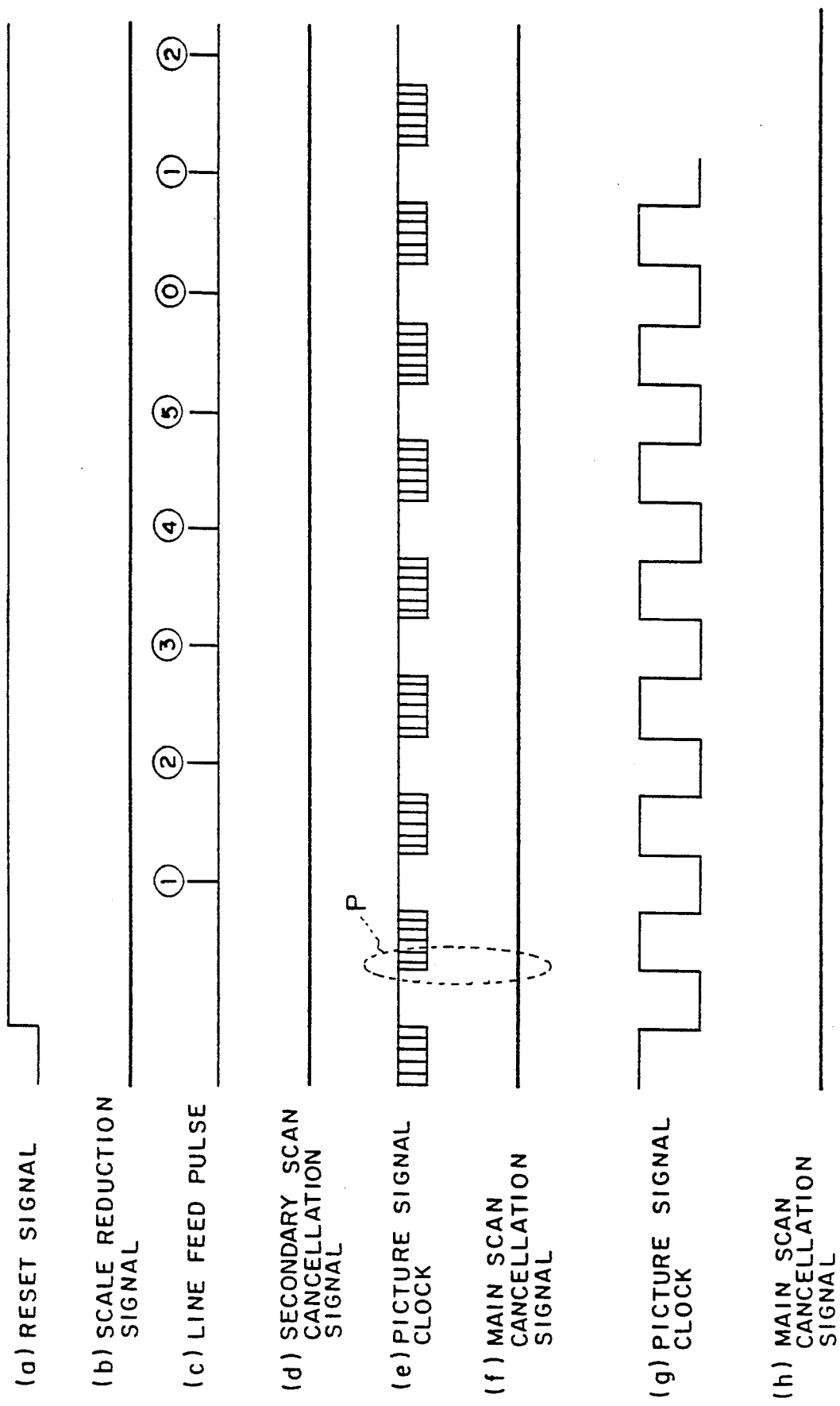

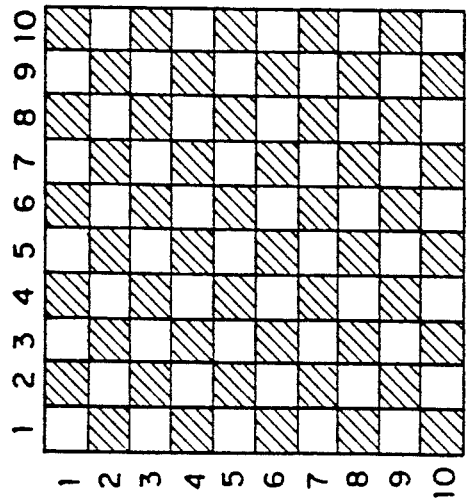
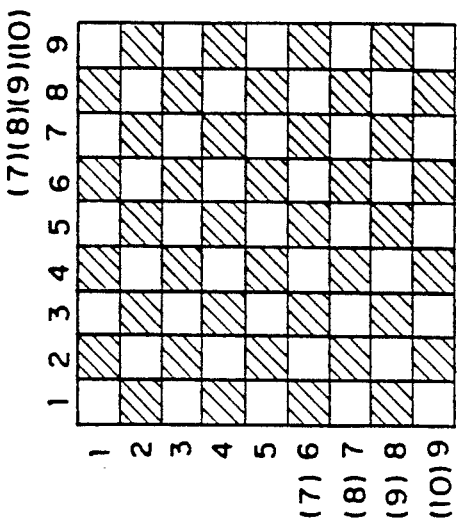
FIG. 14(a)
FIG. 14(b)
FIG. 14(c) SELECTING "6"
FIG. 14(d)

MAIN SCANNING DIRECTION

○: PIXEL OF MAIN SCAN CANCELLATION

△: PIXEL OF SECONDARY SCAN CANCELLATION

⊕: PIXEL OF MAIN AND SECONDARY SCAN CANCELLATION (FIXED TO COORDINATES (6,6))

HALF TONE IMAGE PROCESSING CIRCUIT WITH IMPROVED SCALE REDUCTION IMAGES AND METHOD FOR REDUCING HALF TONE IMAGES

BACKGROUND OF THE INVENTION

1. Field of the Invention

The present invention relates to a half tone image processing circuit which is used in an image processing section of a facsimile machine or the like for implementing half tone processing for scanned images which are to be digitized.

2. Prior Art

FIG. 1 is a block diagram showing a conventional half tone processing circuit and its associated image sensor. In the figure, 1 is an image sensor which reads a main scanning line of a document (will be termed "a line" hereinafter) and produces an analog image signal which represents the scanned image line, 2 is a picture signal sample/hold circuit which samples and holds the image signal and produces a picture signal in synchronism with a picture signal clock, 3 is a clock generation circuit which generates the picture signal clock, 4 is a dither generation circuit which produces elements of a dither matrix, 6 is a comparison circuit which compares the picture signal with elements of the dither matrix outputted by circuit 4 to convert the picture signal into a binary format, 7 is a scale reduction circuit which produces an canceled picture signal clock, 9 is a line feed pulse generation circuit which produces a line feed pulse in response to the reading of one line, 10 is a reset circuit which inhibits the operation of the dither generation circuit 4 and the scale reduction circuit 7, and 11 is a reduction control circuit which produces a scale reduction signal indicative of whether or not scale reduction is to be implemented. 12a indicates a binary picture signal, 12b indicates the picture signal clock produced by the scale reduction circuit 7, and 12c indicates the picture signal clock before cancellation of clock pulses by the circuit 7.

Next, the operation of this circuit will be explained. Initially, the image sensor 1 scans an image, one line at a time, and produces an analog signal the amplitude level of which represents the intensity of the image at each point along the line. Next, the picture signal sample/hold circuit 2 sample-holds the produced analog signal and generates a quantized picture signal in synchronism with the picture signal clock 12c.

The dither generation circuit 4 produces elements of a dither matrix in synchronism with the picture signal clock 12c. The following explanation is based on an example of a 4-by-4 dither matrix, which would be used in a half tone system of 16 shades or tones. The quantized picture signal is a multiple-tone signal which can be resolved into steps of 16 tones.

A multiple-tone image display using a dither matrix is based on the following principle. An image 101 is divided into a number of blocks each consisting of 16 (4×4) pixels as shown in FIG. 16. A dither matrix consisting of 16 (4×4) elements is prepared (see also FIG. 2 (d)). The pixels of each block are compared with the corresponding elements of the dither matrix, such that a pixel is judged to be black when the pixel level is lower than or equal to the element level, and is judged to be white when the pixel level is higher than the element level. It is assumed that the higher the pixel level, the lower the intensity. However, this is a matter of convention and the opposite designation may be used with no change in result. The pixel level to be compared with the dither matrix is in practice the level of the picture signal provided by the picture signal processing circuit 2.

The elements of the dither matrix are set to have values as shown in FIG. 2 (a), (b) and (c), for example. When a picture signal for an image portion with a 0% reflectivity (highest intensity) as shown in the leftmost section of FIG. 2 (a) is received, it is compared with the dither matrix, yielding binary signals 12a as shown in the rightmost section of FIG. 2 (a). Here, the binary signals may be such that black="1" and white="0", or vice versa. The picture signal produced by reading an image portion of 25% reflectivity yields a set of binary signals 12a including 25% white pixels as shown in the rightmost section of FIG. 2 (b). Similarly, a picture signal produced by reading an image portion of 50% reflectivity yields a set of binary signals 12a including 50% white pixels as shown in the rightmost section of FIG. 2 (c). The set of binary signals 12a corresponding to a block of 16 (4×4) pixels includes black pixels proportional to the intensity of the image, and therefore the 16 levels as a whole represent a grey scale or half tone system by analogy.

In the operation of the circuit arrangement shown in FIG. 1, the picture signal sample/hold circuit 2 produces a quantized picture signal, which is a half tone signal of 16 possible steps as described above, in synchronism with the picture signal clock 12c. The dither generation circuit 4 sequentially outputs elements of the dither matrix. The picture signal sample/hold circuit 2 delivers a picture signal consisting of 2048 pixels per line when a B4 size document is read by an image sensor. The dither generation circuit 4 is reset by the reset circuit 10 at the beginning of document scanning and sequentially generates elements of the dither matrix in accordance with the picture signal of the first line. After that, the circuit 4 receives line feed pulses from the line feed pulse generation circuit 9 and in response to these pulses produces dither matrix elements of picture signals of subsequent lines provided by the picture signal processing circuit 2. For example, the dither generation circuit 4 sequentially produces the dither elements of the first line in the order of A, B, C, D, A, B, C, D, A, B, and so on as shown in FIG. 3, (a). In response to the reception of a line feed pulse, the circuit 4 sequentially produces the dither elements of the second line in the order of E, F, G, H, E, F, G, H, E, F, and so on. In this manner, upon receiving a line feed pulse the circuit 4 is switched to produce dither elements for the next line. After the fourth line, dither elements of the first line are produced. In FIG. 16, a picture signal i-j is for a pixel on row i (line i) and in column j.

FIG. 4 is a block diagram showing an example of the dither generation circuit 4. The dither generation circuit 4 begins operation in response to the removal of the reset signal (see FIG. 5, (a)). The reset signal is turned off by the reset circuit 10 under control of a controller (not shown). A quaternary (0 to 3) counter 42 for producing a dither in the main scanning direction counts the picture signal clock pulses 12c (see FIG. 5, (b)) and outputs a binary signal 00, 01, 10 and 11 sequentially for each clock pulse. The count value produced by the counter 42 is decoded by a decoder 43 and thereafter fed to the column address input of matrix register 41, which outputs dither elements of the matrix from the column indicated by the decoded value from decoder 43. Register 41 may be a ROM, RAM or any other suitable addressable memory storage device. The row of the dither matrix is specified by the output of the decoder 45. A quaternary counter 44 for producing a dither in the secondary scanning direction counts the line feed pulses (see FIG. 5, (c)). The count value of the counter 44 is decoded by a decoder 45 and thereafter fed to the row address input of dither matrix register 41 for selecting a row of the dither matrix. In this manner, the dither matrix register 41 outputs the dither elements as shown in FIG. 5, (d). The comparison circuit 6 compares the picture signal samples with the dither elements and outputs the comparison result as the binary signal 12a.

A facsimile machine or a so-called "smart" copier may have an image scale reduction function. For example, it may scan a B4 sized text and send the image by reducing the size to A4. A scale reduction technique in this case is to cancel pixels or "thin out" the binary signal 12a at a certain interval. FIG. 6 shows an example of a scale reduction circuit 7 which cancels one bit out of every 6 bits in the main scanning direction and cancels one line out of every 6 lines in the secondary scanning direction, indicated in FIG. 3 (b). The circuit 7 starts operation in response to the removal of the reset signal and reception of an active (high) scale reduction signal provided by the reduction control circuit 11 (see FIG. 7, (a) and (b)). A hexal (0 to 5) counter 71 for determining the position of cancellation for each line counts the picture signal clock pulses 12c. The count value is delivered to a logical product (AND) gate 73 by way of an inverter 72. The AND gate 73 produces a high output when the count value from counter 71 is 5 (101 binary), otherwise it produces a low output. Consequently, at the output of a logical sum (OR) gate 78, every sixth pulse of the picture signal clock 12c is blocked or canceled in the output signal 12b, and is thus not transmitted to the image processing circuit. FIG. 7 (f) is an enlargement of area P in FIG. 7 (e). Another hexal counter 75 for determining an entire line to be canceled counts the line feed pulses and the count value is fed to an inverter 76 and to an AND gate 77, the output of which is as shown in FIG. 7 (d). This output is delivered to the OR gate 78, which then produces a high output during a period when the counter 75 has a count value of 5 (101 binary). Consequently, the picture signal clock 12c has all its pulses blocked from the image processing circuit 14 for every sixth scanning line.

In this manner, the picture signal clock 12c is subjected to pulse cancellation or inhibition for every one out of six pulses and every one out of six lines. The inhibition of the picture signal clock 12c results in the corresponding cancellation of bits of the binary signal 12a at the following stage of the half-tone image processing circuit 14. Accordingly, the image is reduced to 5/6 the original size. When the scale reduction signal from control circuit 11 is low, the OR gate 78 is in a through state since counters 71 and 75 are disabled, causing the picture signal clock 12c to pass through the gate 78 unperturbed.

When scale reduction is not implemented, processing of the binary signal 12a in accordance with the picture signal clock 12b outputted by scale reduction circuit 7 results in a pattern as shown in FIG. 3 (b). In contrast, when scale reduction is utilized, the binary signal 12a processed in accordance with the picture signal clock 12b is as shown in FIG. 3 (d). This is because the dither matrix elements for the cancelled pixels continue to be outputted by the dither generation circuit 4 in response to clock signal 12c, as shown in FIG. 3(c). That is, as FIG. 1 make apparent, the dither generation circuit 4 continues to respond to clock signal 12c regardless of the operation of scale reduction circuit 7. FIG. 3 is based on the assumption that the pixels of image signals are all at the eighth level (50% reflectivity) of the 16 half tone steps. Numbers in parentheses in FIG. 3 (d) indicate the line numbers before cancellation. As seen from FIG. 3 (d), the image is deteriorated through the cancellation between bit 5 and bit 7 in the main scanning direction and between line 5 and line 7 in the secondary scanning direction, resulting in an uneven pixel pattern in the printed image, causing a deterioration in image quality.

In the conventional half tone processing circuit arranged as described above, scale reduction by pixel cancellation results in the discontinuity of a pixel pattern on both sides of an canceled pixel, and as a result the binary signal after cancellation reproduces an image of degraded quality.

SUMMARY OF THE INVENTION

The present invention solves the above-mentioned problem, and an object is to provide a half tone processing circuit which, even in the case of scale reduction through the cancellation of pixels of a binary signal which is produced from a dither matrix, reproduces an image from the binary signal after cancellation without deteriorating the quality of the image.

The half tone processing circuit of this invention comprises a picture signal sample/hold circuit which samples a line-wise image signal outputted by an image sensor and produces a quantized picture signal, a dither generation circuit which outputs elements of a dither matrix each having a value representing one of the possible intensity levels of the picture signal and produces a dummy dither element to be compared with a picture signal sample at a position of the image for which cancellation is performed depending on the scale reduction factor, a comparison circuit which compares the picture signal with the dither element provided by the dither generation circuit to produce a line-wise binary signal sequentially, and a scale reduction circuit which cancels, from the binary signal provided by the comparison circuit, a binary signal pixel at the position determined depending on the scale reduction factor.

BRIEF DESCRIPTION OF THE DRAWINGS

FIGS. 3 (a)–(d) are diagrams explaining the conventional cancellation technique for a 10-by-10 binary signal;

FIG. 13 is a timing chart explaining the operation of the scale reduction circuit 8 when scale reduction is not implemented;

FIGS. 14 (a)-(d) are diagrams explaining the cancellation operation for a 10-by-10 binary signal according to this invention;

DESCRIPTION OF THE PREFERRED EMBODIMENT

Figure 1:
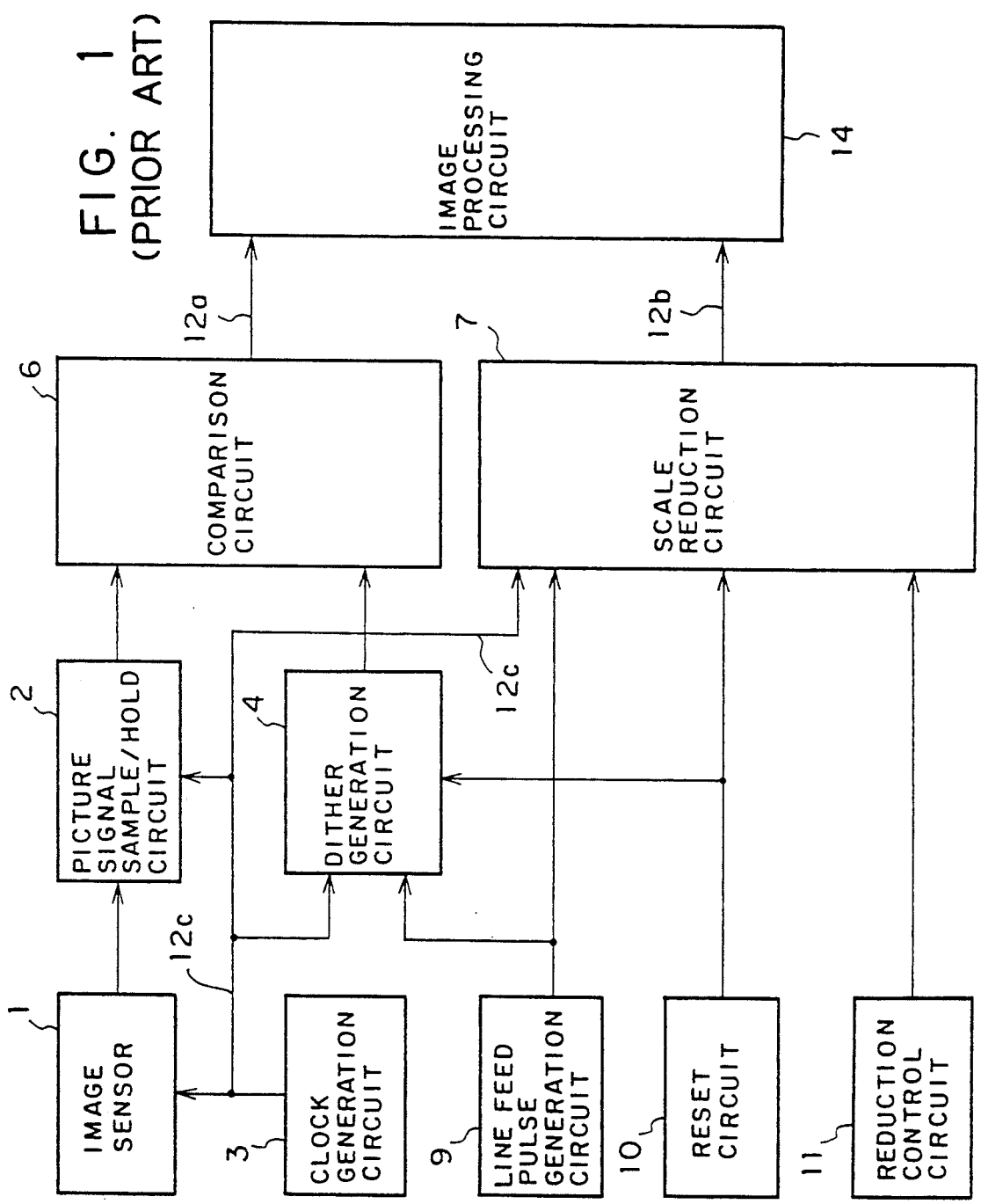
FIG. 1 is a block diagram showing a conventional half tone processing circuit.
Figure 2:
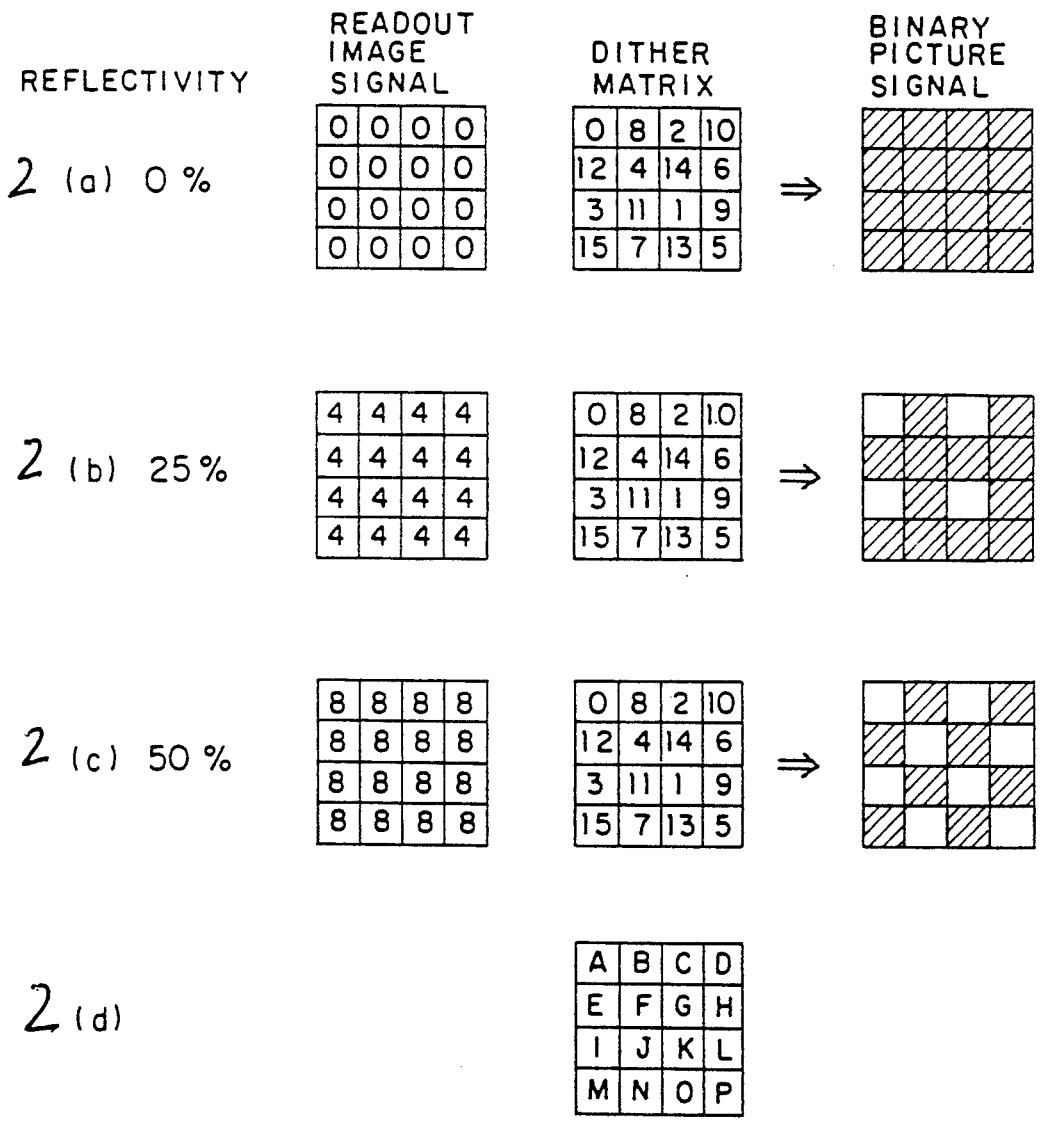
FIGS. 2 (a)–(d) are diagrams for explaining the half tone display by using a dither matrix.
Figure 4:
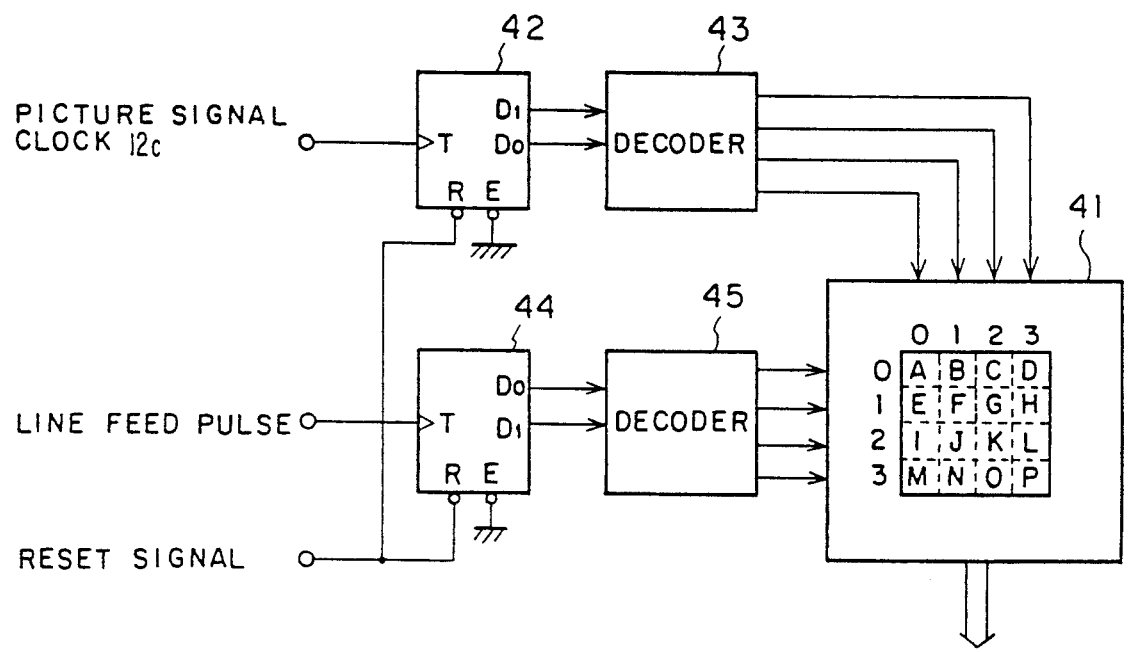
FIG. 4 is a block diagram showing a conventional dither generation circuit.
Figure 5:
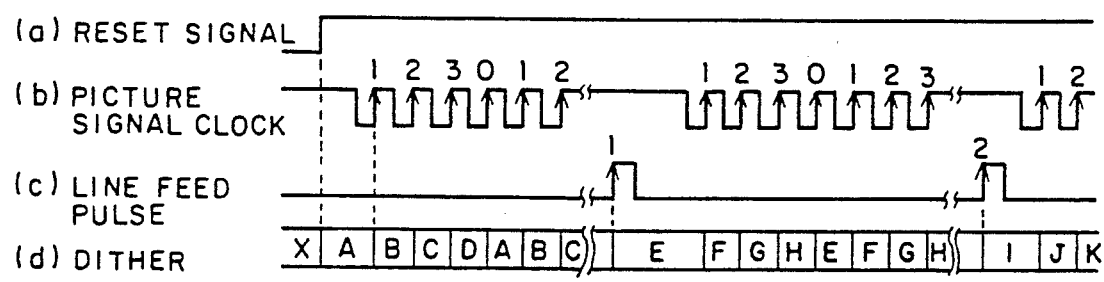
FIG. 5 is a timing chart explaining the operation of the circuit arrangement shown in FIG. 4.
Figure 6:
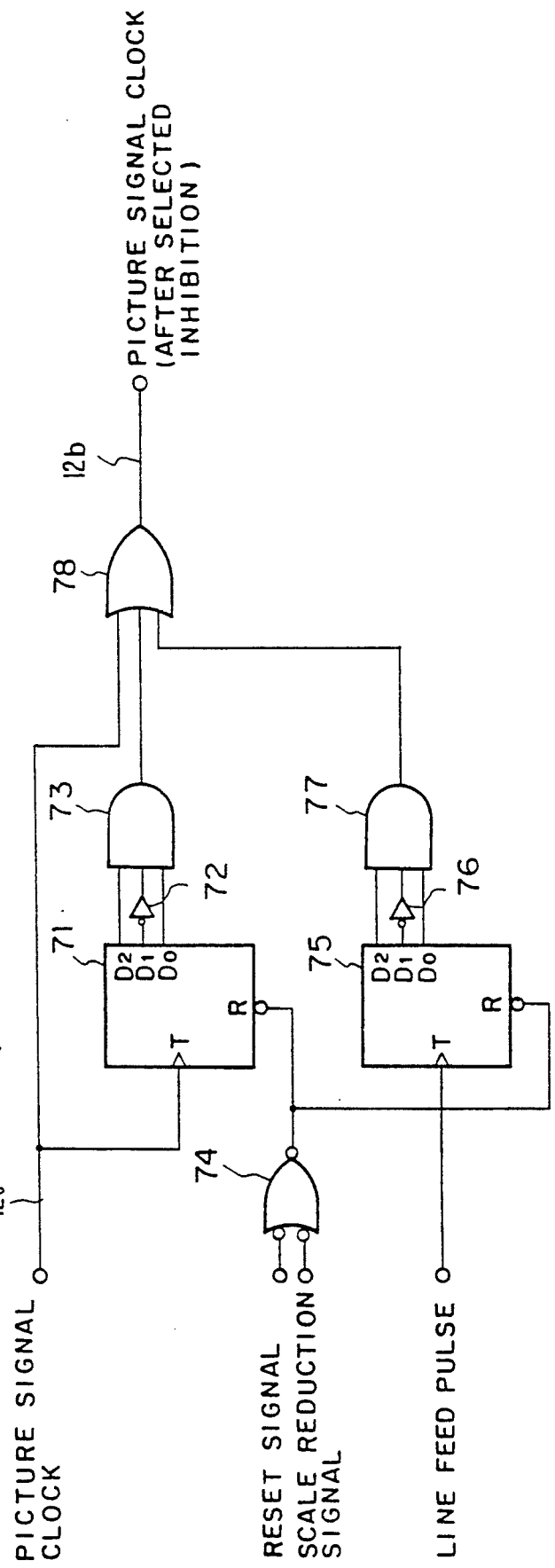
FIG. 6 is a schematic diagram of a conventional scale reduction circuit.
Figure 7:
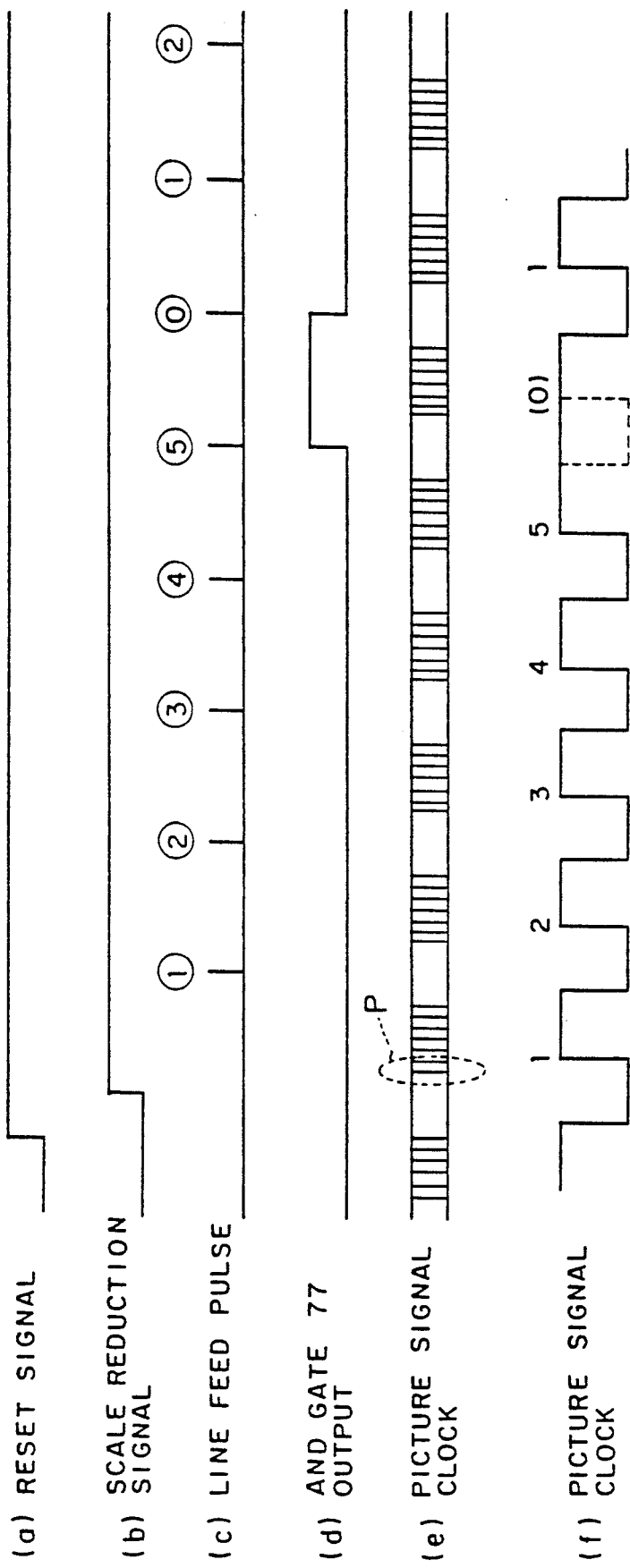
FIG. 7 is a timing chart used to explain the operation of the scale reduction circuit of FIG. 6.
Figure 8:
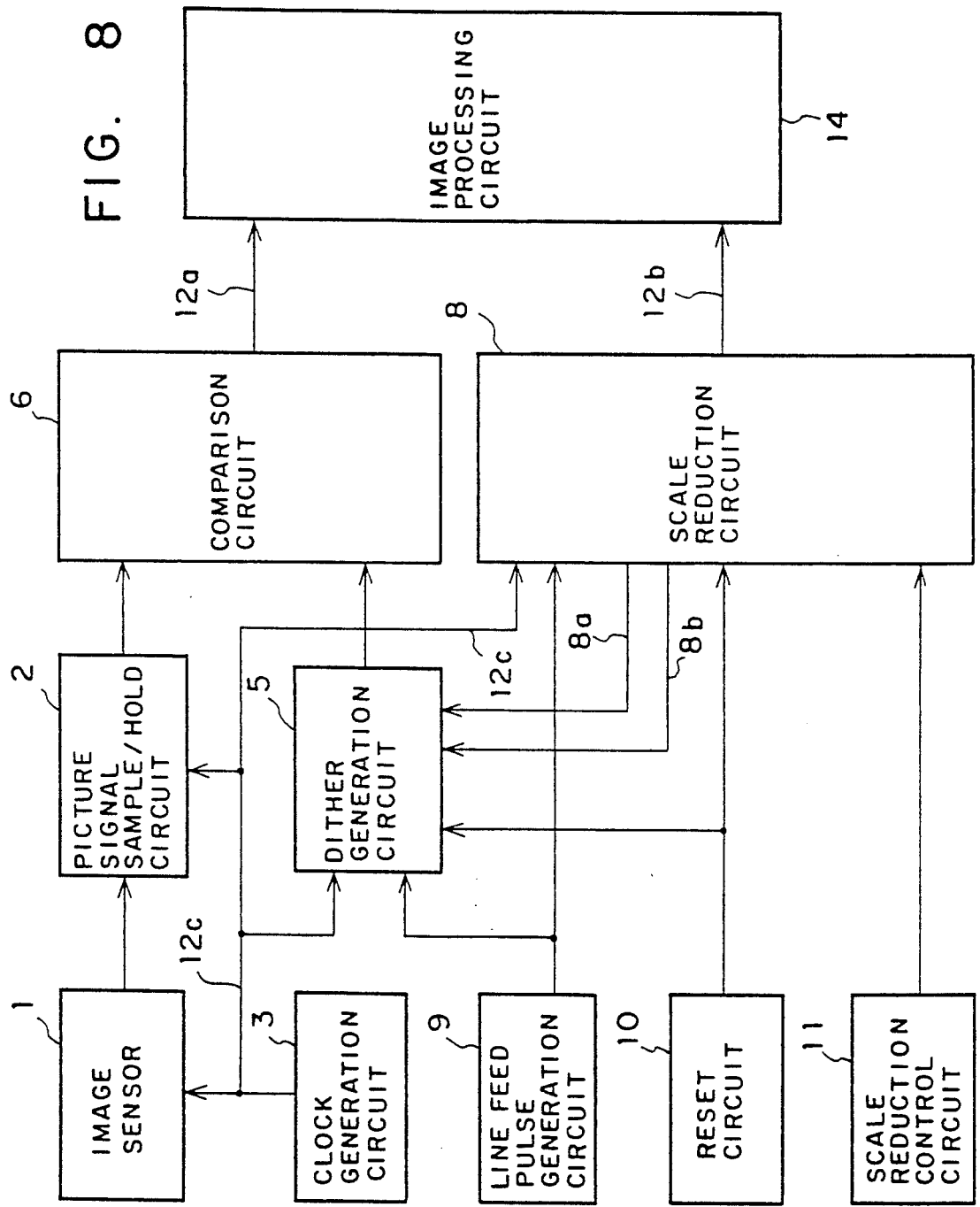
FIG. 8 is a block diagram showing a half tone processing circuit according to a first embodiment of this invention.
Figure 9:
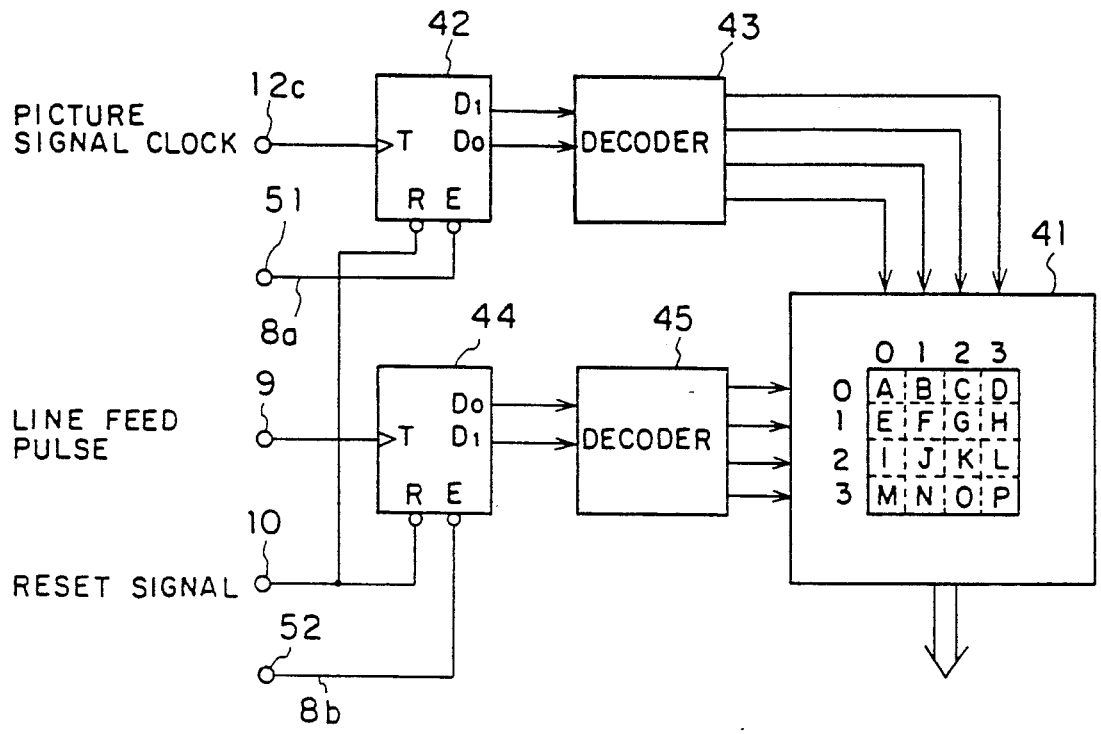
FIG. 9 is a block diagram of the dither generation circuit 5 of FIG. 8.
Figure 16:
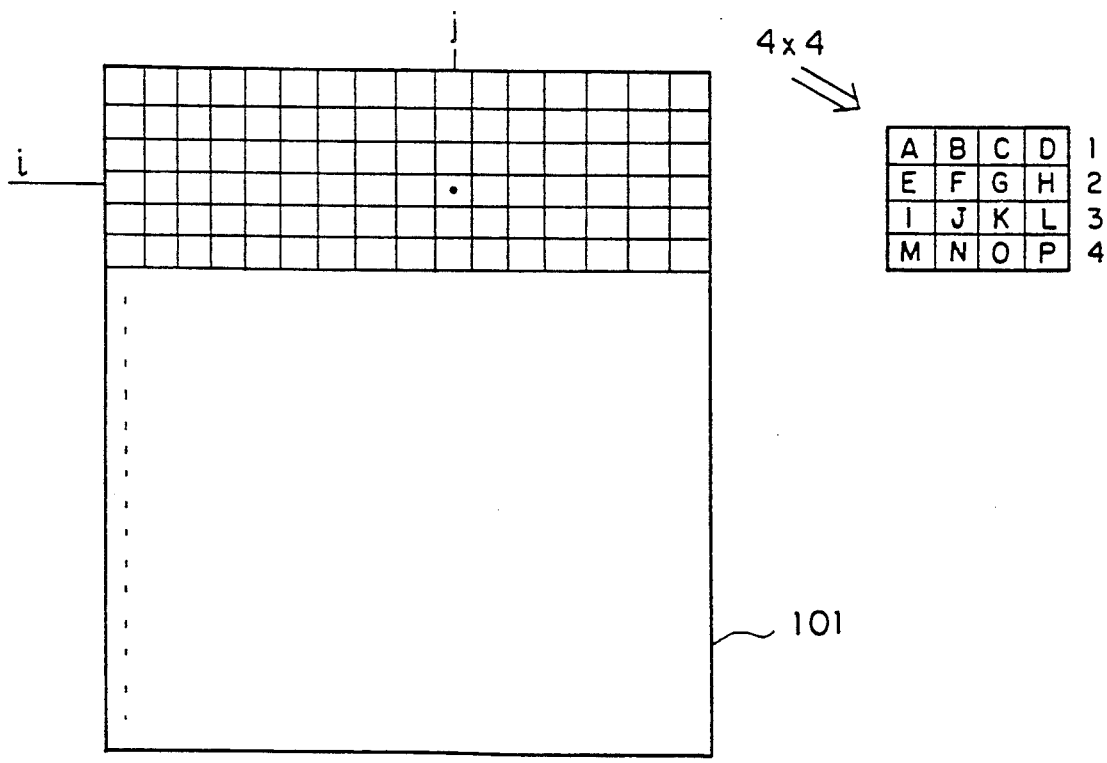
FIG. 16 is a diagram of an original image document explaining the principle of division into blocks for half tone processing.
Figure 11:
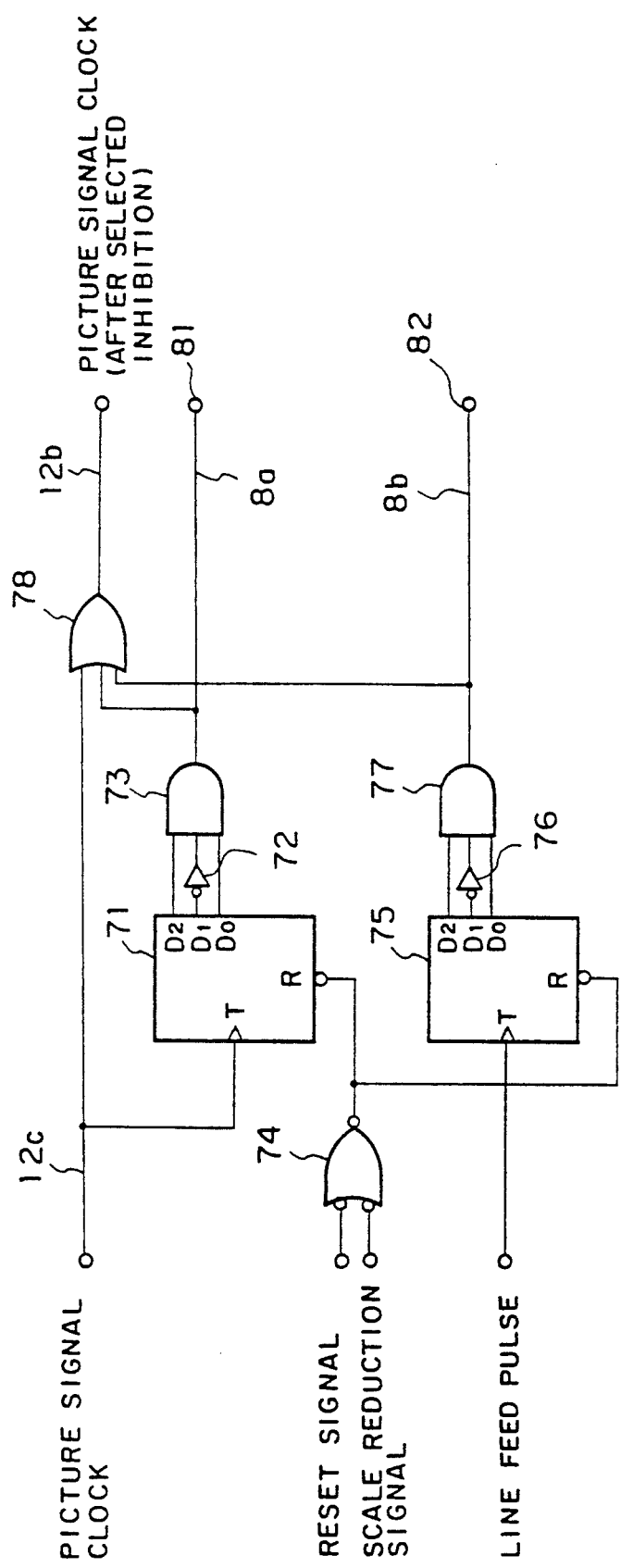
FIG. 11 is a block diagram of the scale reduction circuit 8 of FIG. 8.

One preferred embodiment of the present invention now will be described with reference to the drawings. In FIG. 8, 5 is a dither generation circuit which outputs dither elements including a dummy dither, and 8 is a scale reduction circuit which produces a main scan cancellation signal 8a and a secondary scan cancellation signal 8b. The remaining elements are identical to those shown in FIG. 1, and are identified by like reference numerals. FIG. 9 is a block diagram showing an example of an arrangement of the dither generation circuit 5 according to the invention, which is similar to the arrangement of FIG. 4, but which includes an input terminal 51 for the main scan cancellation signal 8a and an input terminal 52 for the secondary scan cancellation signal 8b. FIG. 11 is a block diagram showing an example of an arrangement of the scale reduction circuit 8, which is similar to the arrangement of FIG. 6, but which includes an output terminal 81 for the main scan cancellation signal 8a and an output terminal 82 for the secondary scan cancellation signal 8b.

Next, the operation of these circuits will be explained. The image sensor scans an image, one line at a time, and produces an analog signal the level of which represents the intensity of the image. Subsequently, the picture signal sample/hold circuit 2 samples and holds the input analog signal and produces a quantized picture signal in synchronism with the picture signal clock 12c. In the dither generation circuit 5, a dither matrix register 41 outputs a dither element in a column determined by the count value of the picture signal clock 12c and in a row indicated by the count value of the line feed pulse from pulse generation circuit 9. In this case, the scale reduction circuit 8 produces a main scan cancellation signal 8a for every sixth pulse of the picture signal clock 12c, at terminal 81. This main scan cancellation signal 8a disables the counter 42, causing it to halt counting once every sixth pulse (see FIG. 10 (b) and (d)). In response to this count halt, the dither matrix register 41 output level does not vary during a 2-pulse period of the picture signal clock 12c. This period is shown by "B, B" in FIG. 10 (f). Namely, between the two "B" dither elements, the leading "B" dither element is a dummy dither. In this manner, the dither matrix register 41 delivers a dummy dither element in response to the main scan cancellation signal 8a.

Figure 10:
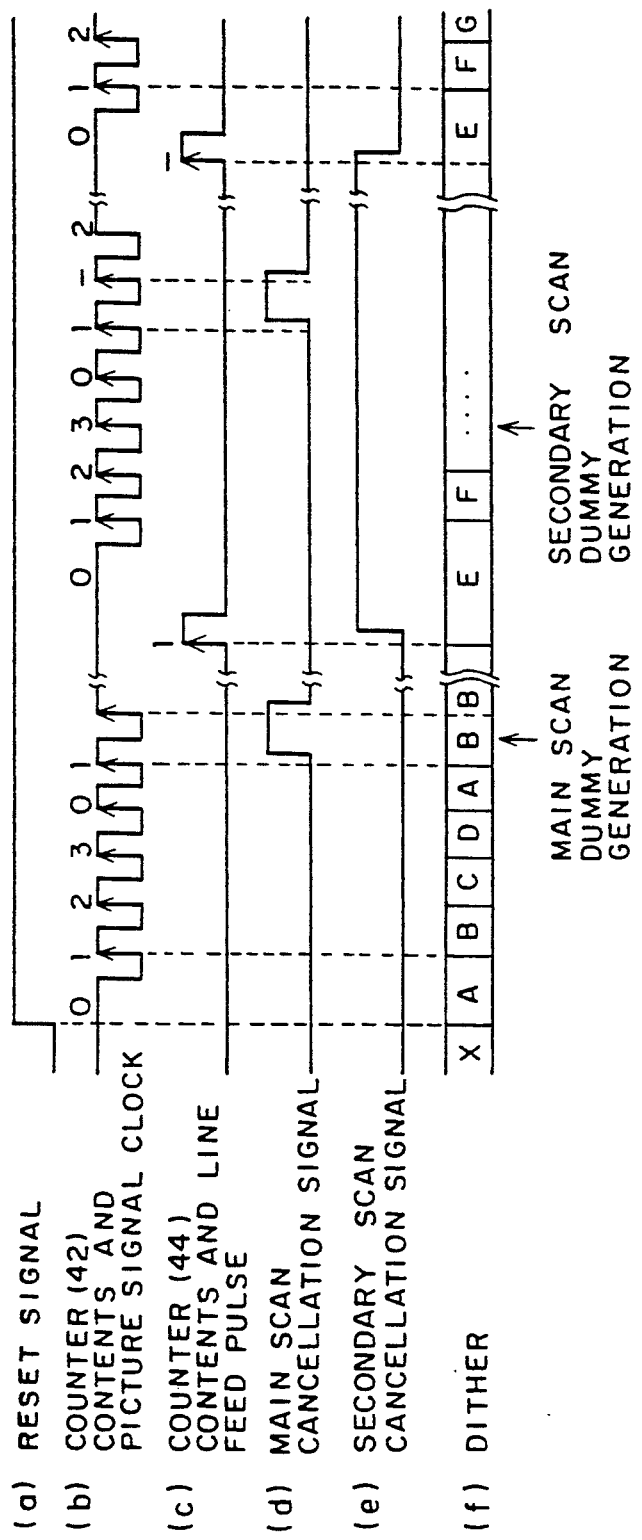
FIG. 10 is a timing chart explaining the operation of the circuit arrangement shown in FIG. 9.

The scale reduction circuit 8 also produces a secondary scan cancellation signal 8b for every sixth line at output terminal 82 (see FIG. 10 (e)). This secondary scan cancellation signal 8b stays high while the picture signal clock 12c for one entire line is being delivered. The counter 44 receives the signal 8b at its enable terminal 52 (low active), and its count value does not advance for a specific line, and a line-wide dummy dither is added to that line.

In the operational mode without scale reduction, the main scan cancellation signal 8a and secondary scan cancellation signal 8b are not produced by the scale reduction circuit 8, and therefore no dummy dither is added to the dither elements provided by the dither matrix register 41. The counter 42 is cleared in response to the generation of the line feed pulse, although it is not shown in the figure. The comparison circuit 6 produces the binary signal 12a in the same manner as the conventional circuit.

Figure 12:
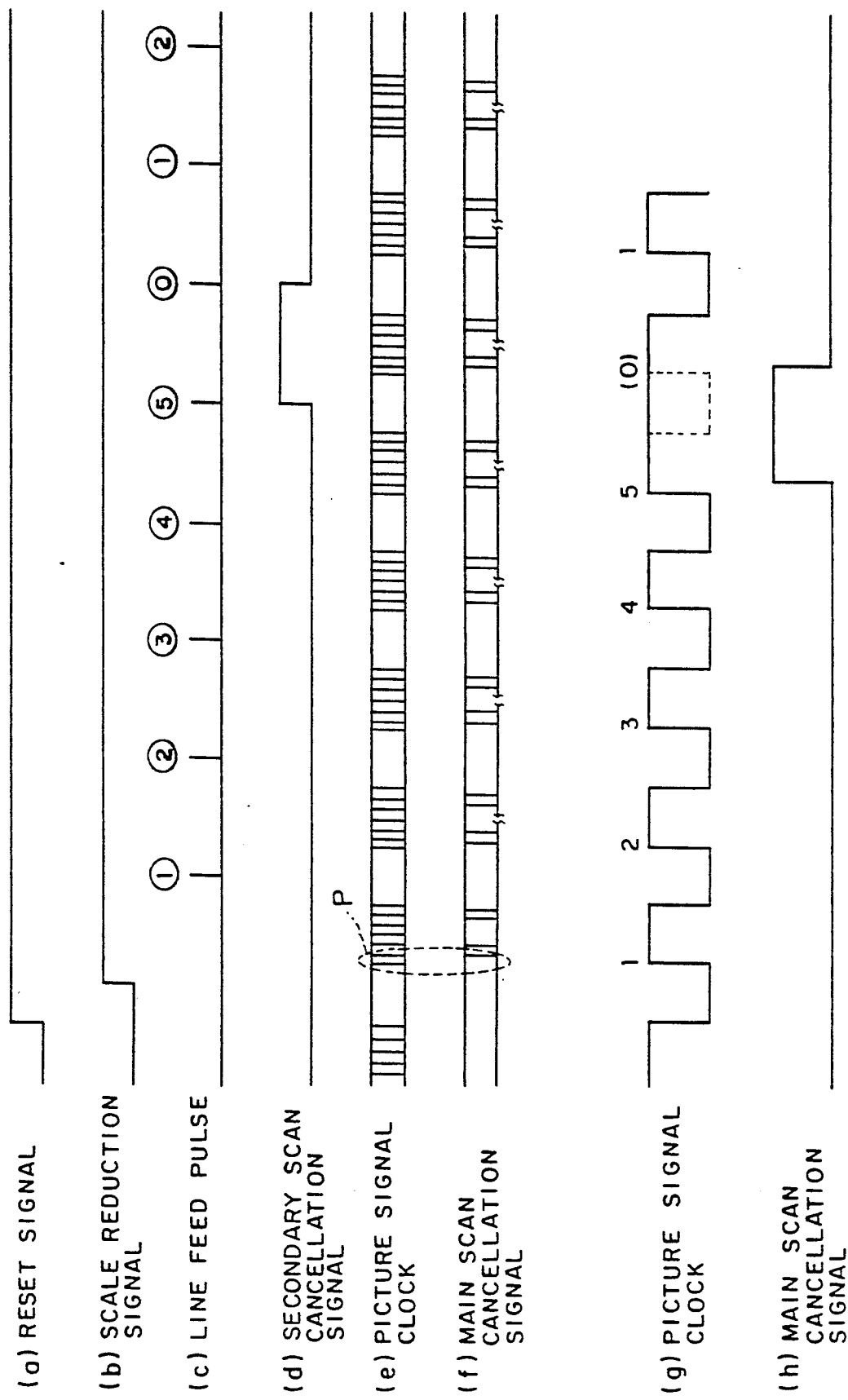
FIG. 12 is a timing chart explaining the operation of the scale reduction circuit 8 when scale reduction is implemented.
Figure 15A:
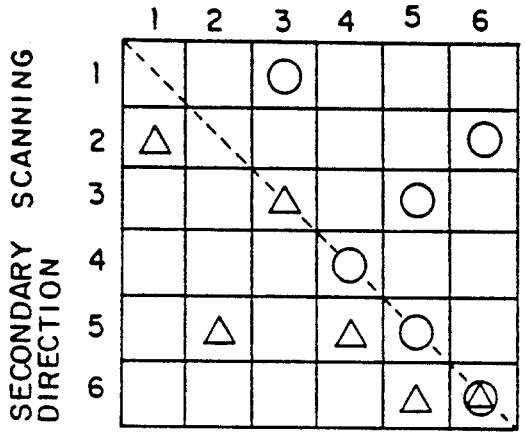
FIGS. 15(a)-(d) are diagrams explaining the operation of an irregular cancellation according to another embodiment of the invention.
Figure 15B:
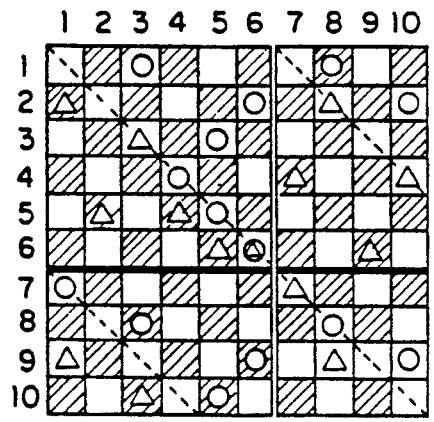
Figure 15C:
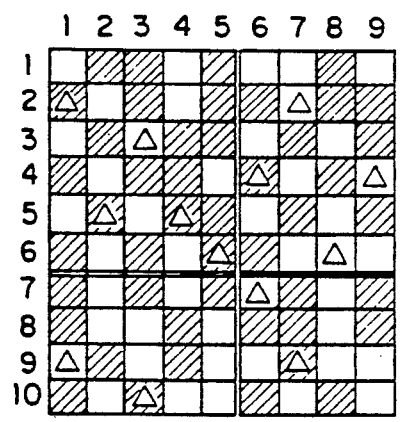
Figure 15D:
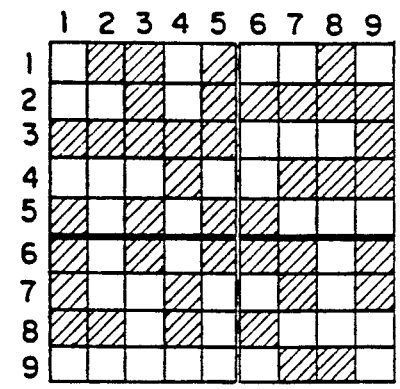

In a scale reduction mode, the scale reduction circuit 8 inhibits a picture signal clock 12c at every sixth pixel and every sixth line, as in the conventional circuit. However, according to the invention, immediately before clock signal inhibition the circuit 8 provides the main scan cancellation signal 8a and secondary scan cancellation signal 8b for the dither generation circuit 5 (see FIGS. 12 (d) and (h)). Namely, the dither generation circuit 5 is designed to deliver a second identical dither element on receiving the main scan cancellation signal 8a and to deliver dither elements of the same row of the dither matrix on receiving the subsidiary scan cancellation signal 8b, and thus the continuity of the dither matrix is retained before and after the pixel or line of cancellation. FIGS. 12 (g) and (h) show the signals of portion P (FIGS. 12(e) and (f)) enlarged. Through the process shown in FIGS. 12 (g) and (h), sampling of the binary signal 12a for the case of 10-by-10 pixel blocks, for example, with the picture signal clock 12b after clock pulse cancellation will result in a pattern as shown in FIGS. 14 (c) and (d).

With the scale reduction signal being low (indicative of no scale reduction) as shown in FIG. 13 (b), the two counters 71 and 75 in the scale reduction circuit 8 are never released from the reset condition, and therefore the main scan cancellation signal 8a and secondary scan cancellation signal 8b are not delivered to dither generation circuit 5 (see FIG. 13 (d) and (f)). Accordingly, the dither generation circuit 5 never produces a dummy dither. Since the picture signal clock 12c is not inhibited, sampling of the binary signal 12a with the picture signal clock 12b provided by the scale reduction circuit 8 will result in a pattern as shown in FIGS. 14 (a) and (b).

Although the foregoing embodiment describes the case of scale reduction by 5/6, i.e. from B4 to A4 size, the reduction factor can be made arbitrary by merely varying the count limits of the counters 71 and 75 and changing the values of the counter outputs for which the clock signal 12c will be inhibited, by changing the connections of the inverters 72 and 76 and the AND gates 73 and 77 from those shown in FIG. 11.

While the foregoing embodiment describes regular or periodic cancellation, the pixel cancellation can be irregular provided that the picture signal clock is inhibited proportionally to the reduction factor in the main scanning direction and the secondary scanning direction.

FIG. 15 is a diagram for explaining a method of irregular cancellation, also with the assumption of a scale reduction factor of 5/6 in this example. An image is partitioned into matrices of 6-by-6 pixels, and cancellation takes place in accordance with the following rules.

Condition 1: On each of rows 1 through 6, a pixel of main scan direction cancellation (marked by "0") must be designated in the right-hand region with respect to the dashed diagonal line.

Condition 2: In each of the columns 1 through 6, a pixel of secondary scan direction cancellation (marked by "Δ") must be designated in the left-hand region with respect to the dashed diagonal line.

Condition 3: The pixels 0 and Δa must not coincide on the diagonal line except for coordinates (6, 6).

FIG. 15 (d) shows the result of cancellation of a 10-by-10 binary signal based on the setting of canceled pixels in compliance with the above rules. FIG. 15 (c) shows the result of cancellation only in the main scanning direction, in which case a scale reduction circuit is provided for inhibiting the picture signal clock for positions of 0 only shown in FIG. 15 (a). Although the picture quality may decay on both sides of each canceled pixel, the degradation of picture quality of the whole image is virtually negligible. This cancellation scheme offers the advantage of preventing a regular disturbance of the picture as compared with the conventional cancellation scheme.

According to this invention, as described above, a dither generation circuit is provided for a half tone processing circuit for generating a dummy dither element in correspondence to a picture signal pixel to be canceled so that, equivalently, the picture signal after cancellation is compared with the elements of the dither matrix, whereby a half tone image can be reproduced without deteriorating picture quality even in the case of scale reduction.

What is claimed is:

1. A half tone image processing circuit, comprising:
   sample/hold means for sampling and holding an image signal representative of sequential lines of an image from an image sensor and outputting a sampled image signal in synchronism with pulses of a clock signal;
   dither generation means for outputting elements of a dither matrix which represent respective image intensity levels of a half tone image display system, in accordance with matrix address signals corresponding to the position of samples of said image signal outputted from said sample/hold means;
   comparison means for comparing samples of said sampled image signal with outputted elements of said dither matrix and outputting a binary image signal according to the result of the comparison; and
   a scale reduction circuit for canceling predetermined bits from said binary image signal in accordance with a preselected scale reduction factor and for causing said dither generation means to output dummy dither elements to be compared with samples of said sampled image signal corresponding to bits to be canceled from said binary image signal as determined by said scale reduction circuit.

2. A half tone image processing circuit according to claim 1, further comprising image processing means for inputting said binary image signal in synchronism with said clock signal;
   said scale reduction circuit inhibiting predetermined pulses of said clock signal corresponding to said predetermined bits from being applied to said image processing means.

3. A half tone image processing circuit according to claim 2, wherein said scale reduction circuit comprises:
   a first counter for counting pulses of said clock signal;
   a second counter for counting pulses of a line feed pulse signal which are indicative of a new line of said image; and
   logic means for gating said clock signal to said image processing means and inhibiting said clock signal from being applied to said image processing means when the count values of either of said first and second counters are indicative of said predetermined bits to be canceled according to said scale reduction factor.

4. A half tone image processing circuit according to claim 3, wherein said dither generation means comprises:
   a third counter for counting pulses of said clock signal;
   a fourth counter for counting pulses of said line feed pulse signal;
   a dither matrix register for storing the dither matrix elements;
   decoder means for addressing said dither matrix register by generating said matrix address signals in accordance with the count values of said third and fourth counters;
   said logic means including means for preventing said third and fourth counters from counting when said count values of said first and second counters respectively are indicative of said predetermined bits to be canceled from said binary image signal, so as to cause said dither matrix register to output dummy dither elements corresponding to the previously outputted dither elements.

5. A half tone image processing circuit according to claim 4, wherein said first and second counters are hexal counters, said third and fourth counters are quaternary counters, and said dither matrix register stores a 4-by-4 element matrix of dither elements.

6. A half tone image processing circuit according to claim 5, further including means for resetting said first through fourth counters, and means for selectively inhibiting the operation of said scale reduction circuit.

7. A half tone image processing circuit, comprising:
   sample/hold means for sampling and holding an image signal representative of sequential lines of an image from an image sensor and outputting a sampled image signal in synchronism with pulses of a clock signal;
   dither generation means for sequentially outputting elements of a dither matrix which represent respective image intensity levels of a half tone image display system in accordance with said clock signal for generating dither elements corresponding to the position of samples of said image signal outputted from said sample/hold means;
   comparison means for comparing samples of said sampled image signal with outputted elements of said dither matrix and outputting a binary image signal according to the result of the comparison; and a scale reduction circuit for canceling predetermined bits from said binary image signal in accordance with a preselected scale reduction factor and for inhibiting the sequencing of said dither generation means so as to cause samples of said sampled image signal corresponding to bits to be canceled from said binary image signal to be compared with previously outputted dither elements from said dither generation means.

8. A method of reducing the size of a digital half tone image, comprising the steps of:

receiving a sampled image signal in synchronism with a clock signal;

sequentially outputting dither matrix elements corresponding to samples of said sampled image signal;

comparing said samples with said outputted dither matrix elements to generate a digital half tone image signal;

canceling predetermined bits from said digital half tone image signal according to a preselected scale reduction factor; and temporarily halting the sequencing of outputted dither matrix elements in response to the reception of a sample of said sampled image signal corresponding to a bit to be canceled from said digital half tone image signal.

* * * * *

UNITED STATES PATENT AND TRADEMARK OFFICE
CERTIFICATE OF CORRECTION

PATENT NO. : 5,243,441
DATED : September 7, 1993
INVENTOR(S) : Toshiyuki Kawata

It is certified that error appears in the above-indentified patent and that said Letters Patent is hereby corrected as shown below:

Col. 3, line 39, after "circuit" but before the period, insert --14--

Signed and Sealed this

Twelfth Day of April, 1994

Attest:

BRUCE LEHMAN

*Attesting Officer*     *Commissioner of Patents and Trademarks*